United States Patent
Hanatatsu et al.

[11] Patent Number: 5,907,797
[45] Date of Patent: May 25, 1999

[54] RADIO COMMUNICATION ANALYZER HAVING COLLECTIVE MEASUREMENT FUNCTION OF TRANSMISSION TEST ITEMS

[75] Inventors: Masami Hanatatsu, Atsugi; Chihiro Tagawa, Isehara; Takayuki Morikawa, Atsugi, all of Japan

[73] Assignee: Anritsu Corporation, Tokyo, Japan

[21] Appl. No.: 08/821,768

[22] Filed: Mar. 20, 1997

[30] Foreign Application Priority Data

Mar. 28, 1996 [JP] Japan .................................. 8-074260

[51] Int. Cl.⁶ ...................................................... H04Q 7/34
[52] U.S. Cl. .......................... 455/115; 455/42; 375/316; 375/322; 375/354
[58] Field of Search ............................... 455/115, 63, 61, 455/60, 42, 67.1, 67.3; 379/88; 375/316, 322, 354

[56] References Cited

U.S. PATENT DOCUMENTS 5,805,666  2/1996  Ishizuka et al. .

OTHER PUBLICATIONS

Personal Digital Cellular Telecommunication System RCR Standard issued on Jun. 27, 1995; Research & Development Center for Radio Systems (RCR); pp. 789–808.

Personal Handy Phone System ARIB Standard; Version 2; issued on Dec. 26, 1995; Association of Radio Industries & Businesses (ARIB); pp. 429–447.

*Primary Examiner*—Dwayne D. Bost
*Assistant Examiner*—Linwood C. Scott, Jr.
*Attorney, Agent, or Firm*—Frishauf, Holtz, Goodman, Langer & Chick

[57] ABSTRACT

A radio communication analyzer tests the signal characteristics of a carrier, as a target signal to be tested, which has undergone quadrature modulation using a digital data signal output from a radio unit to be tested. A quadrature demodulation section performs quadrature demodulation of the target signal and outputs a baseband signal. A storage section stores the waveform data of the baseband signal. A clock synchronous detection section detects clock synchronization information contained in the target signal based on the waveform data. A demodulation section sequentially reads out the waveform data and obtains demodulated digital data in accordance with the clock synchronization information. A burst synchronous detection section generates burst synchronization information representing a burst start position of the target signal on the basis of the demodulated digital data or the waveform data.

20 Claims, 8 Drawing Sheets

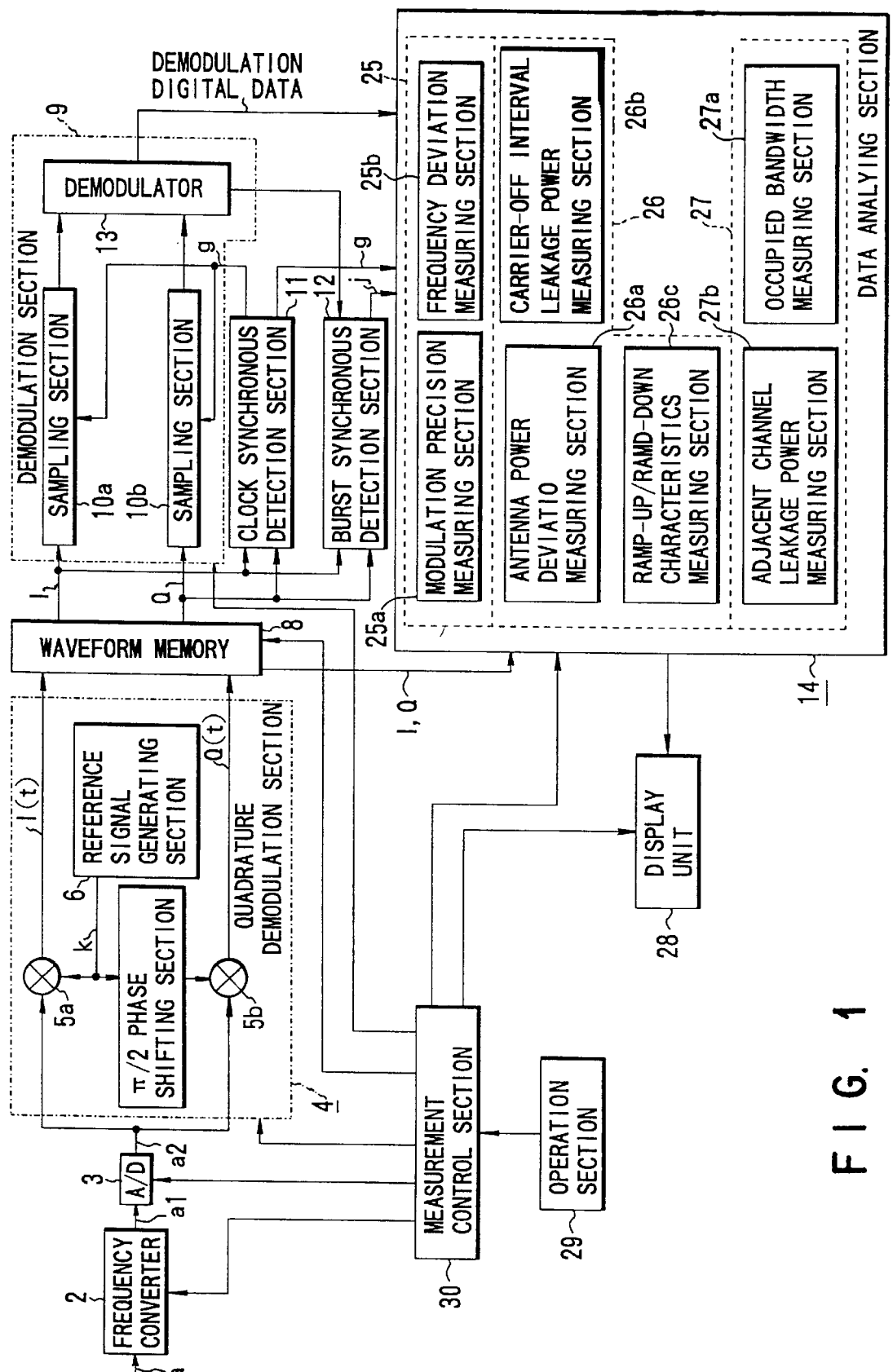
F I G. 1

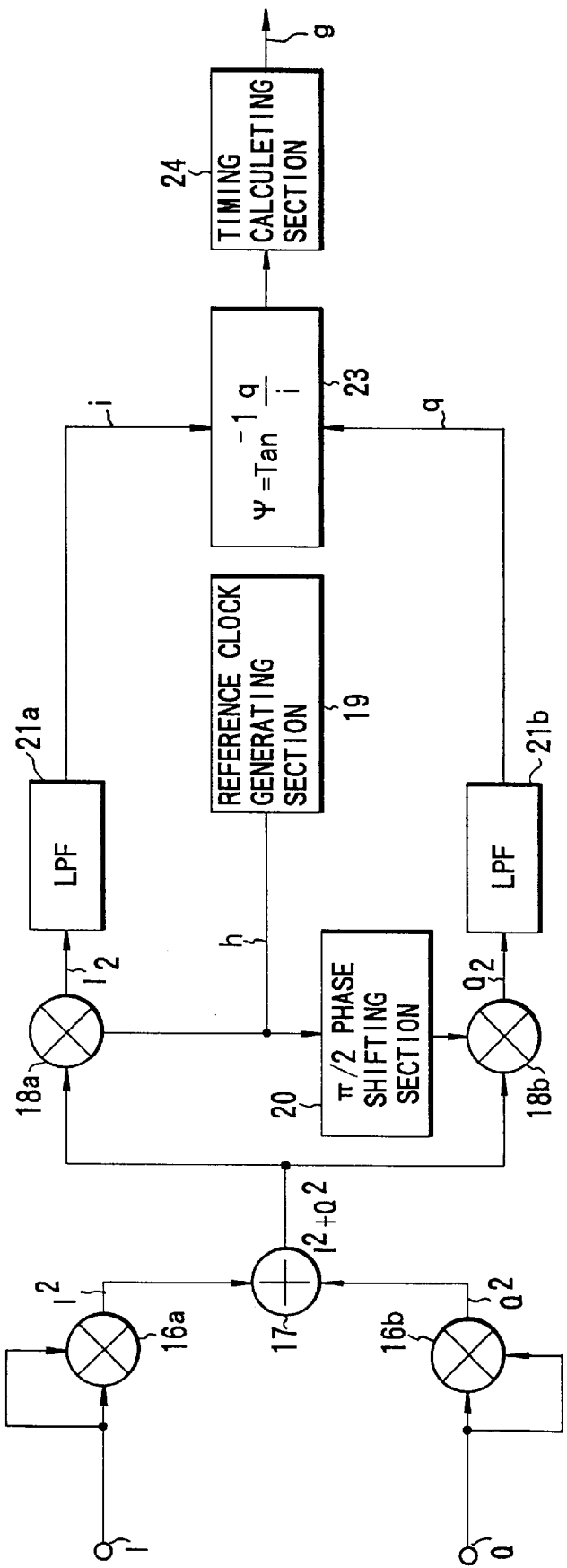
F I G. 2

TOTAL MEASUREMENT RESULTS

| MEASUREMENT ITEM | MEASUREMENT ON/OFF | UNIT | DETERMI-NATION ON/OFF | MEASUREMENT VALUE | DETERMI-NATION RESULT pass/Fail |
|---|---|---|---|---|---|
| 1 FREQUENCY, MODULATION MEASUREMENT | | | | | |
| CARRIER FREQUENCY | ON | | ON | 1895MHz | pass |
| FREQUENCY ERROR | ON | | ON | 0.001MHz | pass |
| RMS ERROR | ON | | ON | 1.35% | pass |
| PERK ERROR | ON | | ON | 4.35% | pass |
| PHASE ERROR | ON | | ON | 1.35deg | pass |
| 2 POWER MEASUREMENT | | | | | |
| TEX POWER | OFF | | — | — | — |
| CARRIER-OFF POWER | ON | | ON | -32.0dBm | pass |
| ON/OFF RATIO | ON | | ON | 66dB | Fail |
| MODULATION POWER | OFF | | — | — | — |
| RISE TIME | ON | | ON | 12.0μs | pass |
| FALL TIME | ON | | ON | 12.0μs | pass |
| 3 FREQUENCY MEASUREMENT | | | | | |
| OCCUPIED BANDWIDTH | ON | | ON | 29.1KHz | pass |
| ADJACENT CHANNEL LEAKAGE POWER | ON | | ON | -70.0dB | pass |

OVERALL DETERMINATION:FAIL

28

F I G. 10

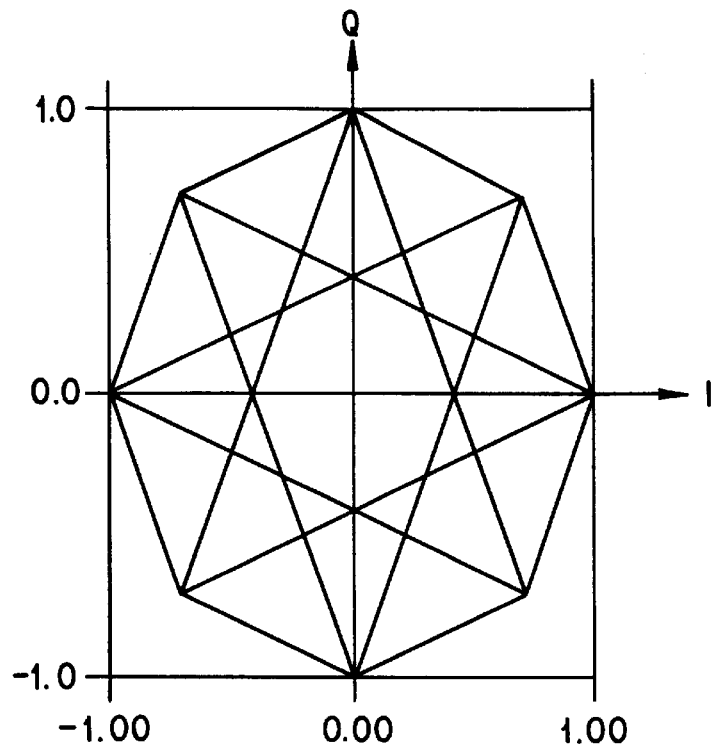
F I G. 11A
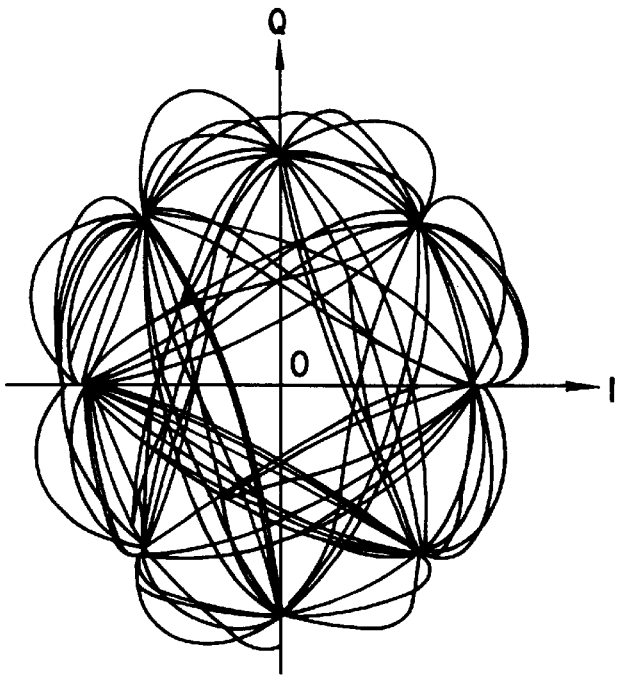
F I G. 11B

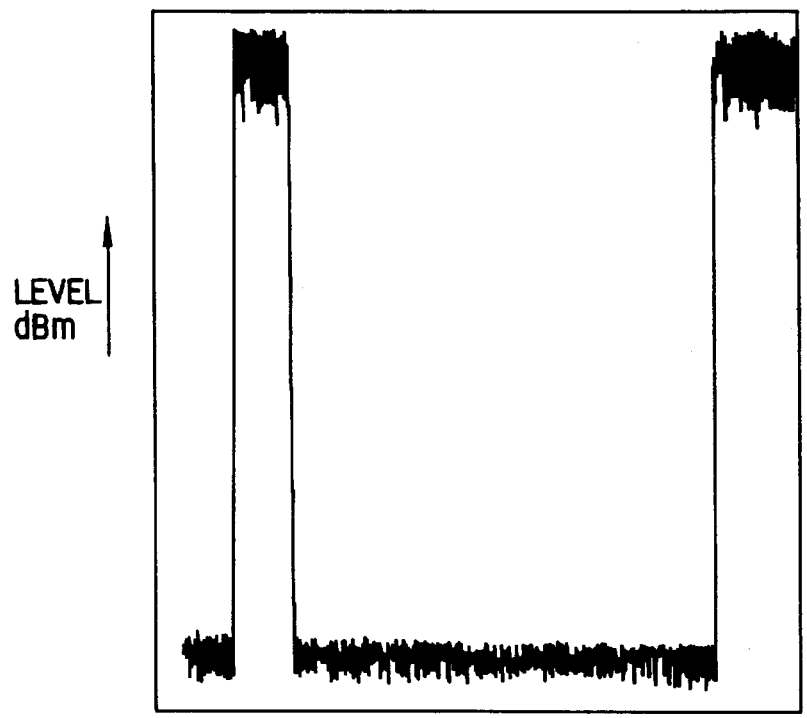
F I G. 12
F I G. 13

RADIO COMMUNICATION ANALYZER HAVING COLLECTIVE MEASUREMENT FUNCTION OF TRANSMISSION TEST ITEMS

BACKGROUND OF THE INVENTION

The present invention relates to a radio communication analyzer having a function of testing the function of a radio unit and, more particularly, to a radio communication analyzer for testing the signal characteristics of a target signal (to be tested) obtained by phase modulation of a carrier wave with a digital data signal.

In order to effectively use communication lines, TDMA (Time Division Multiple Access) is used as a communication scheme between a base station and a radio unit as a mobile terminal, e.g., a car phone or a portable telephone, used in a mobile communication system.

As such TDMA schemes, PDC, PHS, GSM, and the like are used in practice. A burst signal having a signal interval $T_1$ and a non-signal interval $T_2$ set in one signal period $T_0$ like the one shown in FIG. 3 is exchanged between a base station and each radio unit (substation).

In this burst signal, digital data to be transmitted, which consists of "1" or "0", is converted into a digital baseband signal (to be referred to as a digital data signal hereinafter) with a predetermined clock signal. Quadrature modulation of a high-frequency carrier is performed by using this digital data signal. The resultant signal is then inserted in the signal interval (burst interval) $T_1$ of the burst signal.

In a radio communication analyzer that measures the signal transmitted from each radio unit to a base station to check whether it has signal characteristics complying with certain standards, the analyzer receives the burst signal output from the radio unit as a target signal, and measures various characteristics and precisions of the target signal.

The measurement items concerning characteristics and precisions to be measured in the conventional techniques roughly fall into the following three categories:

(a) measurement of inphase and quadrature components on a coordinate system to check whether a carrier is properly phase-modulated with a digital data signal (data on the I/Q coordinate system will be referred to as I/Q coordinate data, and measurement of such data will be referred to as I/Q coordinate data measurement);

(b) power measurement, e.g., measurement of the amplitude of a target signal; and (c) frequency measurement of a target signal.

Note that I/Q coordinate data measurement includes measurement of modulation precision, frequency deviation, and the like, and power measurement includes measurement of antenna power deviation, carrier-off interval leakage power, ramp-up/ramp-down characteristics, and the like.

Frequency measurement includes measurement of occupied bandwidth, adjacent channel leakage power, and the like.

In general, measurement is mainly performed in the quadrature modulation (phase) domain (a), the amplitude domain (b), and the frequency domain (c) because of easy implementation of measuring devices.

According to a general technique of performing each of the above measurements in a radio communication analyzer, the analyzer is set in a measurement mode for one measurement category to measure the respective characteristics and precisions in the set measurement category.

More specifically, when, for example, the antenna power deviation, carrier-off interval leakage power, and ramp-up/ramp-down characteristics in the power measurement category are to be measured, a clock signal for a digital data signal is regenerated from a received target signal, and a burst start signal indicating the start of a burst interval is regenerated.

Signal acquisition positions for the target signal are specified by this clock signal, and the burst start position of the target signal is specified by the burst start signal.

Subsequently, the antenna power deviation during the burst interval (carrier-on interval), carrier-off interval leakage power indicating power during the burst-off interval (carrier-off interval), and burst rise/fall characteristics are calculated.

It is then checked whether the obtained characteristics meet the standards.

When measurement processing for the respective characteristics and precisions concerning the respective measurement items belonging to one measurement category is complete, the radio communication analyzer is set in a measurement mode for the next measurement category to start measurement of the respective characteristics and precisions in the set measurement category.

As described above, the measurement modes of the radio communication analyzer are sequentially switched to measure the respective characteristics and precisions in the respective measurement categories, as needed.

The following problems remain to be solved in the above radio communication analyzer.

In the respective measurement categories described above, precision and error measurements are independently performed. However, even characteristic measurement and precision measurement concerning different measurement categories sometimes include a common procedure for processing a target signal.

For example, the clock signal and the burst start signal must be detected in both the power measurement category and the I/Q coordinate data measurement category described above.

Every time the radio communication analyzer is switched to a mode corresponding to one of the above measurement categories, detection processing for the same clock signal and the same burst start signal must be executed, resulting in a deterioration in measurement efficiency.

Assume that the respective measurement items belonging to a plurality of measurement categories are to be executed. In this case, when the operator designates one measurement category, the respective characteristics and precisions in the designated measurement category are measured. When the measurement is complete, the measurement results are displayed on a display unit.

The operator then designates the next measurement category to execute measurement of the respective characteristics and precisions in the designated measurement category.

In this manner, the operator sequentially designates the respective measurement categories, and checks the measurement results on the display screen. That is, the operator must repeatedly execute such a series of complicated operations. The measurement efficiency may therefore greatly deteriorate.

In addition, since measurement is executed for the respective measurement categories on the basis of data of a target signal in different time zones, the measurement is performed for different target signals in effect. In the strict sense, since the respective measurement results are not obtained from the same target signal, the test results cannot be compared/collated.

BRIEF SUMMARY OF THE INVENTION

The present invention has been made in consideration of the above situation, and has as its object to provide a radio communication analyzer, in which considering that the above measurement items fall into categories (a), (b), and (c), as described above, a target signal to be tested is stored in a waveform memory, and processes common to the respective measurement categories are shared, thereby allowing concurrent execution of measuring operations concerning the respective measurement items belonging to the respective measurement categories on the basis of the same target signal, simultaneous display of the measurement results, a great improvement in measurement efficiency, and a great improvement in operability in measurement.

According to the first aspect of the present invention, there is provided a radio communication analyzer for testing signal characteristics of a carrier, as a target signal to be tested, which has undergone quadrature modulation using a digital data signal output from a radio unit to be tested, comprising:

an A/D converter for converting the target signal into a target digital signal;

a quadrature demodulation section for performing quadrature demodulation of the digital signal obtained by the A/D converter and outputting digital baseband signals;

a waveform memory for storing waveforms of the digital baseband signals output from the quadrature demodulation section;

a clock synchronous detection section for detecting clock synchronization information for the digital data signal which is contained in the target signal from the signal waveforms stored in the waveform memory;

a demodulation section for sequentially reading out the baseband signals stored in the waveform memory and obtaining demodulated digital data by using the clock synchronization information detected by the clock synchronous detection section;

a burst synchronous detection section for producing burst synchronization information representing a burst start position of the target signal from the demodulated digital data produced by the demodulation section or the signal waveforms stored in the waveform memory;

I/Q coordinate data measuring means for measuring characteristics of an inphase component (I) and a quadrature component (Q) of the target signal, on an I/Q coordinate system, from the signal waveforms stored in the waveform memory by using the clock synchronization information, the burst synchronization information, and the demodulated digital data;

power measuring means for obtaining an amplitude domain characteristic of the target signal from the signal waveforms stored in the waveform memory by using the clock synchronization information and the burst synchronization information;

frequency measuring means for obtaining a frequency domain characteristic of the target signal from the signal waveforms stored in the waveform memory by using the burst synchronization information; and a display unit for simultaneously displaying at least two of the characteristics of the inphase component (I) and quadrature component (Q) of the target signal which are obtained by the I/Q coordinate data measurement means, the amplitude domain characteristic of the target signal which is obtained by the power measuring means, and the frequency domain characteristic of the target signal which is obtained by the frequency measuring means.

According to the second aspect of the present invention, there is provided a radio communication analyzer for testing signal characteristics of a carrier, as a target signal to be tested, which has undergone quadrature modulation using a digital data signal output from a radio unit to be tested, comprising:

quadrature demodulation means for performing quadrature demodulation of the target signal and outputting a baseband signal;

storage means for storing waveform data of the baseband signal output from the quadrature demodulation means;

clock synchronous detection means for detecting clock synchronization information contained in the target signal on the basis of the waveform data stored in the storage means;

demodulation means for sequentially reading out the waveform data stored in the storage means and obtaining demodulated digital data in accordance with the clock synchronization information detected by the clock synchronous detection means;

burst synchronous detection means for producing burst synchronization information representing a burst start position of the target signal based on the demodulated digital data produced by the demodulation means or the waveform data stored in the storage means;

measuring means for measuring an amplitude domain characteristic of the target signal, a frequency domain characteristic of the target signal, and characteristics of an inphase component (I) and quadrature component (Q) of the target signal on an I/Q coordinate system, based on the waveform data stored in the storage means, by selectively using the clock synchronization information detected by the clock synchronous detection means, the burst synchronization information detected by the burst synchronous detection means, and the demodulated digital data obtained by the demodulation means; and output means for outputting the amplitude domain characteristic of the target signal, the frequency domain characteristic of the target signal, and the characteristics of the inphase component (I) and quadrature component (Q) of the target signal on the I/Q coordinate system, which are obtained by the measuring means, in association with each other.

In the radio communication analyzer having the above arrangement, a target signal input from a radio unit to be tested is converted into a digital target signal by the A/D converter. The digital signal is then demodulated into a digital baseband signal by the quadrature demodulation section.

The demodulated baseband signal is temporarily stored in the waveform memory. The clock synchronous detection section detects clock synchronization information for a digital data signal in the target signal stored in the waveform memory.

The burst synchronous detection section detects burst synchronization information representing the start position of the target signal stored in the waveform memory.

The I/Q coordinate data measuring means calculates I/Q coordinate data of the target signal such as the modulation precision and frequency deviation. The power measuring means calculates the power precisions of the target signal such as the antenna power deviation, the carrier-off interval leakage power, and the ramp-up/ramp-down characteristics.

The frequency measuring means calculates the frequency precisions of the target signal such as the occupied bandwidth and the adjacent channel leakage power.

In this case, the common data obtained in advance, e.g., the clock synchronization information, the burst synchronization information, and the demodulated digital data, are used by the respective measuring means in the process of calculating characteristics and precisions. Since clock synchronization information, burst synchronization information, demodulated digital data, and the like need not be obtained for each measuring means as each measurement category, the processing efficiency of each precision calculating means can be improved.

In addition, since the respective measuring means calculate characteristics and precisions by using the same signal stored in the waveform memory, comparison/collation can be executed between the respective calculation results, improving the calculation precision.

Furthermore, since the calculation precisions calculated by the respective precision calculating sections are simultaneously displayed on the display unit, the test performance of the operator can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the schematic arrangement of a radio communication analyzer according to an embodiment of the present invention;

FIG. 2 is a block diagram showing the schematic arrangement of a clock synchronous detection section incorporated in the radio communication analyzer;

FIG. 10 is a view showing the measurement results displayed on the display unit of the radio communication analyzer;

FIGS. 11A and 11B are views showing the phase characteristics of the target signal on the I/Q coordinate system which are displayed on the display unit;

FIG. 12 is a graph showing the time characteristic of the target signal which is displayed on the display unit; and FIG. 13 is a graph showing the frequency characteristic of the target signal which is displayed on the display unit.

DETAILED DESCRIPTION OF THE INVENTION

Figure 3:
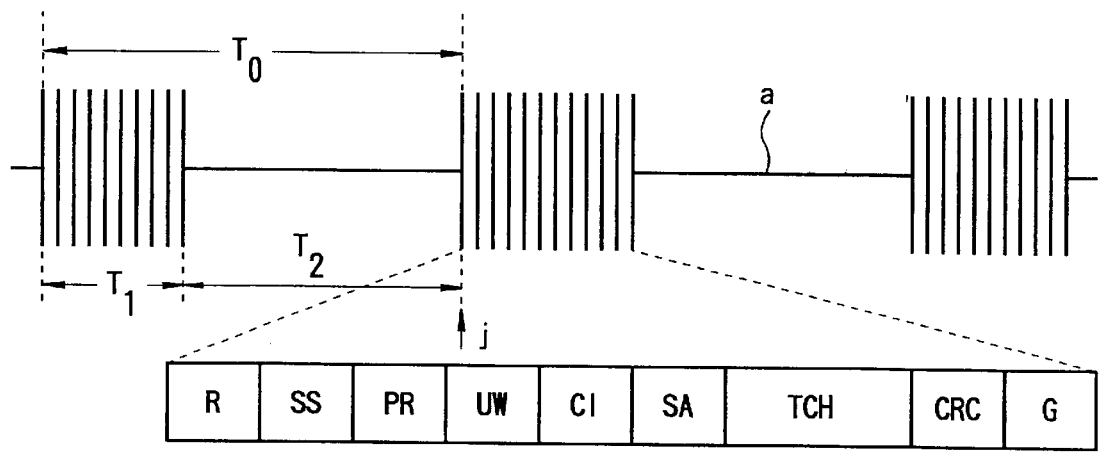
FIG. 3 is a timing chart showing a target signal which is a burst signal.

Reference will now be made in detail to the presently preferred embodiments of the invention as illustrated in the accompanying drawings, in which like reference characters designate like or corresponding parts throughout the several drawings.

An embodiment of the present invention will be described below with reference to the accompanying drawing.

FIG. 1 is a block diagram showing the schematic arrangement of a radio communication analyzer according to this embodiment.

In the radio communication analyzer of this embodiment, processes such as demodulation of a signal to be tested into a digital signal are executed by a kind of information processor including a memory, a computer, and the like.

First of all, a signal a to be tested which consists of a burst signal having the waveform shown in FIG. 3 and is input from a portable telephone unit or the like as a radio unit to be tested to an input terminal 1 is input to a frequency converter 2.

FIG. 3 shows the format of the transmission frame set in a signal interval $T_1$ of this signal a.

A ramp time R is set at the head of the transmission frame, and a start symbol SS, a preamble PR, a sync word UW, a channel type CI, and SACCH (SA) are then set in the order named. Information channel TCH in which data to be transmitted is set follows the above data. After the information channel TCH, a cyclic code CRC and a guard time G are set.

The carrier frequency of this signal a is frequency-converted into an intermediate frequency $f_C$ by the frequency converter 2.

A signal $a_1$ to be tested which has undergone the frequency conversion is converted into a digital signal $a_2$ (to be converted) by an A/D converter 3 at a predetermined sampling period.

The digital signal $a_2$ having undergone the A/D conversion in the A/D converter 3 is supplied to a quadrature demodulation section 4.

The digital signal $a_2$ input to the quadrature demodulation section 4 is input to multiplying sections 5a and 5b.

A reference signal generating section 6 is constituted by a ROM in which sine waveform data is stored. The reference signal generating section 6 sequentially reads out amplitude values stored at the respective addresses in the ROM to finally output a reference signal k having a frequency equal to the intermediate frequency $f_C$.

This reference signal k is directly input to one multiplying section 5a. In addition, the phase of the reference signal k is shifted 90° (π/2) by a π/2 phase shifting section 7. The resultant signal is input to the other multiplying section 5b.

The multiplying sections 5a and 5b multiply the input signal $a_2$ by the two orthogonal reference signals k to output baseband signals I(t) and Q(t) as quadrature demodulation outputs.

The digital baseband signals I(t) and Q(t) output from the quadrature demodulation section 4 are written in a waveform memory 8.

Assume that the waveform memory 8 has a storage capacity large enough to store/hold the sampled data of each of the baseband signals I(t) and Q(t) which corresponds to a time width equal to or more than one signal period $T_0$ of the signal a consisting of a signal interval (burst interval) $T_1$ and a non-signal interval $T_2$ in FIG. 3.

The baseband signals I(t) and Q(t) equal to or more in amount than data corresponding to one signal period $T_0$ are always are stored in the waveform memory 8.

The baseband signals I(t) and Q(t) stored in the waveform memory 8 are sequentially read out and input to sampling sections 10a and 10b of a demodulation section 9, and also input to a clock synchronous detection section 11 and a burst synchronous detection section 12.

The clock synchronous detection section 11 regenerates a clock signal g as clock synchronization information used to regenerate a digital data signal from each of the baseband signals I(t) and Q(t).

The regenerated clock signal g is input to each of the sampling sections 10a and 10b.

The sampling sections 10a and 10b sample the baseband signals I(t) and Q(t) in synchronism with the clock signals g and output the sampled data to a demodulator 13.

For example, the demodulator 13 generates demodulated digital data based on the two input sampling data, and outputs the demodulated digital data to a data analyzing section 14 and the burst synchronous detection section 12.

For example, the clock synchronous detection section 11 is constituted by a plurality of software processing sections, as shown in FIG. 2.

The digital baseband signals I(t) and Q(t) sequentially read out from the waveform memory 8 are respectively squared by square calculating sections 16a and 16b and subjected to signal synthesis in a synthesizing section 17.

A synthetic signal $(I^2+Q^2)$ output from the synthesizing section 17 is sent to multiplying sections 18a and 18b.

A reference clock generating section 19 uses a ROM that stores sine waveform data. The reference clock generating section 19 sequentially reads out amplitude values stored at the respective addresses in the ROM to finally output a reference clock signal h having a frequency almost equal to a clock frequency $f_0$ equal to the period of the original digital data signal.

This reference clock signal h is directly input to one multiplying section 18a. In addition, the phase of the reference clock signal h is shifted 90° (π/2) by a π/2 phase shifting section 20. The resultant signal is input to the other multiplying section 18b.

The multiplying sections 18a and 18b multiply the input synthetic signals $(I^2+Q^2)$ by the orthogonal reference clock signals h to output phase signals $I_2(t)$ and $Q_2(t)$.

High-frequency components are removed from the phase signals $I_2(t)$ and $Q_2(t)$ output from the multiplying sections 18a and 18b by low-pass filters (LPFs) 21a and 21b. The resultant signals are input to a phase difference calculating section 23, as integration values i, g.

The phase difference calculating section 23 calculates a phase difference ψ between the baseband signals I(t) and Q(t) and the reference clock signals h based on the integration values i, g, and outputs the phase difference ψ to a timing calculating section 24.

In this case, the phase difference ψ is given by ψ=Tan⁻¹ (q/i).

When the phase of the reference clock signal h output from the reference clock generating section 19 is reached with the phase ψ, the timing calculating section 24 outputs a clock signal g to the sampling sections 10a and 10b of the demodulation section 9, and also outputs it to the data analyzing section 14.

Figure 4:
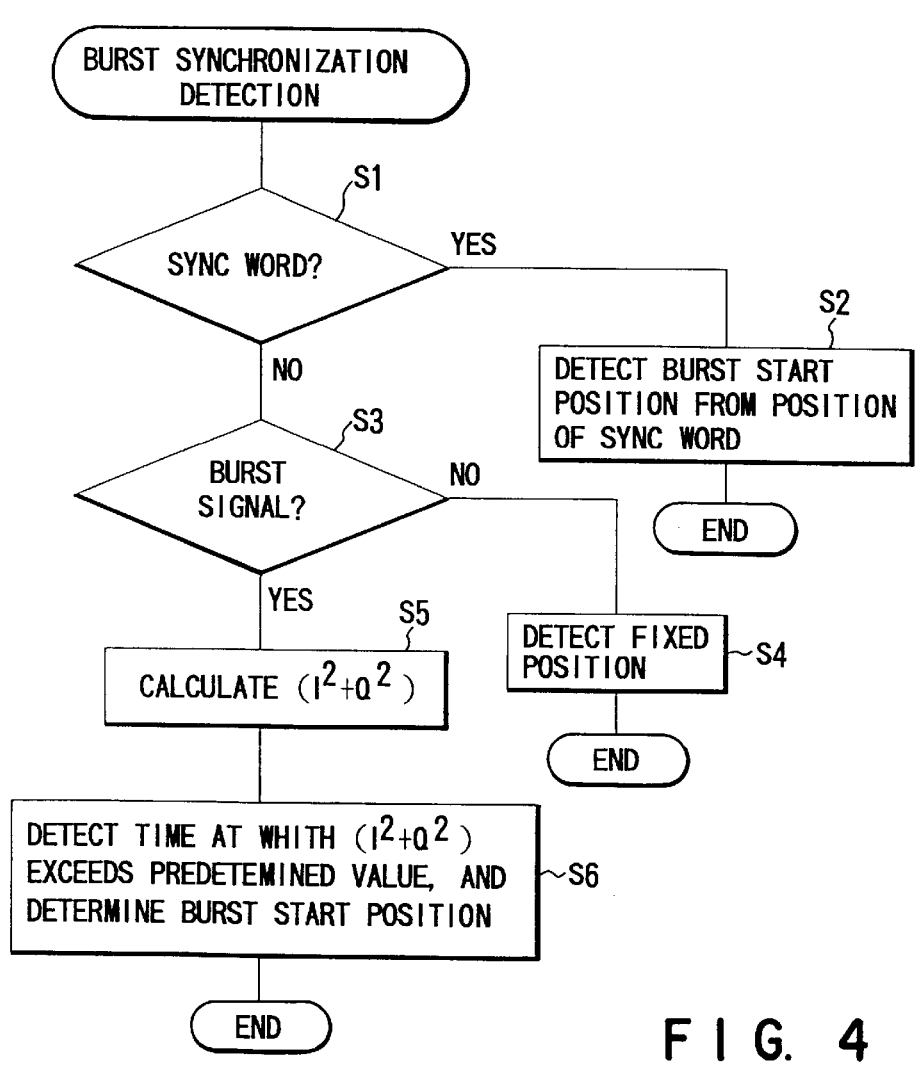
FIG. 4 is a flow chart showing the operation of a burst synchronous detection section incorporated in the radio communication analyzer.

The burst synchronous detection section 12 regenerates a burst start signal j as burst synchronization information indicating the start position of the signal interval (burst interval) $T_1$ of the signal a in accordance with the flow chart of FIG. 4.

Assume that the operator sets in advance whether a sync word is set or not in the signal a, and the signal a is the burst signal shown in FIG. 3 or a continuous signal.

Assume that the sync word UW is set in the signal a. In this case, when the processing based on the flow chart of FIG. 4 is started, the burst synchronous detection section 12 retrieves the demodulated digital data input from the demodulation section 9 and corresponding to the one signal period $T_0$ for the sync word UW, and specifies a burst start position on the basis of this sync word position, thereby outputting a burst start signal j (steps S1 and S2).

Assume that the sync word UW is not set, and the signal a to be tested is the burst signal shown in FIG. 3. In this case, the burst synchronous detection section 12 calculates each synthetic value $(I^2+Q^2)$ of the baseband signals I(t) and Q(t) sequentially input from the waveform memory 8, and detects the time when the synthetic value $(I^2+Q^2)$ exceeds a predetermined value to determine a burst start position, thereby outputting a burst start signal j (steps S1, S3, S5, and S6).

When the sync word UW is not set, and the signal a is a continuous signal, the burst synchronous detection section 12 detects a fixed position as the position of the burst start signal j which is set at an arbitrary position in the one signal period $T_0$ (steps S1, S3, and S4).

The burst synchronous detection section 12 then outputs the detected burst start signal j to the data analyzing section 14.

The data analyzing section 14 is constituted by an information processor, and incorporates an I/Q coordinate data measuring section 25, a power measuring section 26, and a frequency measuring section 27 which correspond to three types of measurement categories, i.e., I/Q coordinate data measurement, power measurement, and frequency measurement.

The I/Q coordinate data measuring section 25 incorporates a modulation precision measuring section 25a and a frequency deviation measuring section 25b. The power measuring section 26 incorporates an antenna power deviation measuring section 26a, a carrier-off interval leakage power measuring section 26b, and a ramp-up/ramp-down characteristics measuring section 26c.

The frequency measuring section 27 incorporates an occupied bandwidth measuring section 27a and an adjacent channel leakage power measuring section 27b.

A display unit 28 for displaying measurement results is connected to the data analyzing section 14. An operating section 29 for designating a measurement item is also connected to the data analyzing section 14 through a measurement control section 30.

Procedures for processing in the respective measuring sections 25, 26, and 27 will be described in detail next with reference to FIGS. 5 to 9.

Figure 5:
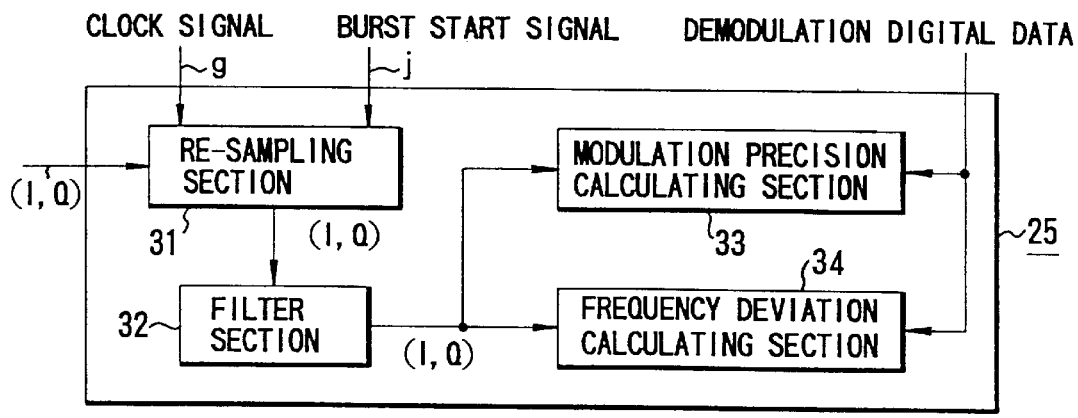
FIG. 5 is a block diagram showing the schematic arrangement of an I/Q coordinate data measuring section incorporated in the radio communication analyzer.

FIG. 5 shows the detailed procedures for processing in the modulation precision measuring section 25a and the frequency deviation measuring section 25b in the I/Q coordinate data measuring section 25.

A re-sampling section 31 re-samples the baseband signals I(t) and Q(t) stored in the waveform memory 8 on the basis of the clock signal g output from the clock synchronous detection section 11 and the burst start signal j output from the burst synchronous detection section 12, and outputs the sample data to a filter section 32.

The filter section 32 executes filtering processing of the respective input I/Q coordinate data by using a filter having root Nyquist characteristics.

A modulation precision calculating section 33 calculates the modulation precision of the signal a by using the I/Q coordinate data having undergone the filtering processing in the filter section 32 and the demodulated digital data obtained by the demodulation section 9.

A frequency deviation calculating section 34 calculates the frequency deviation of the signal a by using the I/Q coordinate data having undergone the filtering processing in the filter section 32 and the demodulated digital data obtained by the demodulation section 9.

As described above, the I/Q coordinate data measuring section 25 in FIG. 5 calculates the modulation precision and frequency deviation of the signal a by using the regenerated clock signal g, the burst start signal j, and the demodulated digital data.

Figure 6:
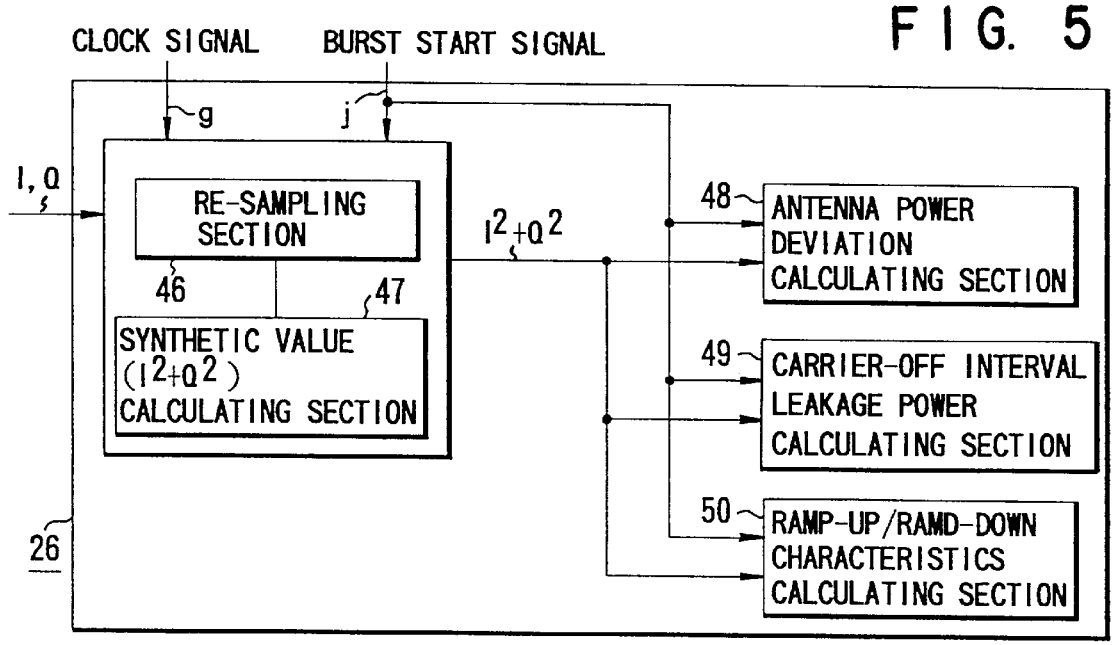
FIG. 6 is a block diagram showing the schematic arrangement of a power measuring section incorporated in the radio communication analyzer.

FIG. 6 shows the detailed procedures for processing in the antenna power deviation measuring section 26a, the carrier-off interval leakage power measuring section 26b, and the ramp-up/ramp-down characteristics measuring section 26c in the power measuring section 26.

Note that the data herein are data read out from the waveform memory 8, and are identical to the data used in the I/Q coordinate data measuring section 25 in the time domain.

A re-sampling section 46 re-samples the baseband signals I(t) and Q(t) stored in the waveform memory 8 on the basis of the clock signal g output from the clock synchronous detection section 11 and the burst start signal j output from the burst synchronous detection section 12. A synthetic value $(I^2+Q^2)$ calculating section 47 then calculates the synthetic values $(I^2+Q^2)$ of the power values of the respective re-sampled I and Q data, and outputs them to calculating sections 48, 49, and 50.

The antenna power deviation calculating section 48 extracts the synthetic value $(I^2+Q^2)$ in each signal interval (burst interval) $T_1$ from the respective synthetic values $(I^2+Q^2)$ of the I/Q data input from the re-sampling section 46 by using the burst start signal j, and calculates a mean value of the respective synthetic values $(I^2+Q^2)$ as an antenna power deviation.

The carrier-off interval leakage power calculating section 49 extracts the synthetic value $(I^2+Q^2)$ in each non-signal interval (carrier-off interval) $T_2$ from the respective synthetic values $(I^2+Q^2)$ of the I/Q data input from the re-sampling section 46 by using the burst start signal j, and calculates the average value of the respective synthetic values $(I^2+Q^2)$ as carrier-off interval leakage power.

The ramp-up/ramp-down characteristics calculating section 50 extracts the synthetic value $(I^2+Q^2)$ near the switching position from each non-signal interval $T_2$ to the corresponding signal interval $T_1$ and the synthetic value $(I^2+Q^2)$ near the switching position from each signal interval $T_1$ to the corresponding non-signal interval $T_2$ from the respective synthetic values $(I^2+Q^2)$ of the I/Q data input from the re-sampling section 46, and calculates the ramp-up/ramp-down characteristics of the power from the change of the respective synthetic values $(I^2+Q^2)$.

As described above, the power measuring section 26 in FIG. 6 calculates the antenna power deviation, carrier-off interval leakage power, and rise/fall characteristics of the signal a by using the regenerated clock signal g and the burst start signal j.

Figure 7:
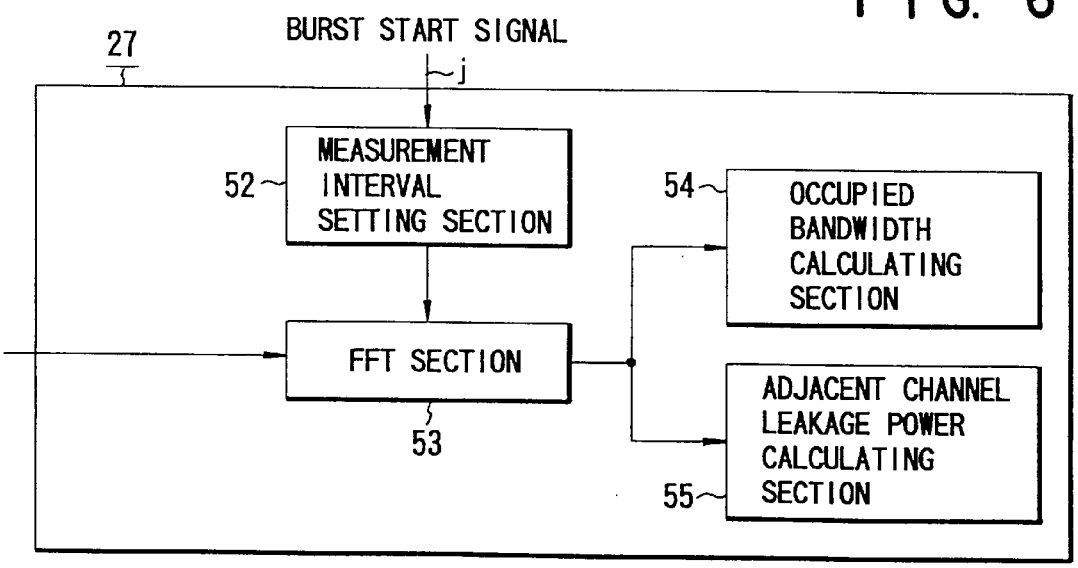
FIG. 7 is a block diagram showing the schematic arrangement of a frequency measuring section incorporated in the radio communication analyzer.

FIG. 7 shows the detailed procedures for processing in the occupied bandwidth measuring section 27a and the adjacent channel leakage power measuring section 27b in the frequency measuring section 27.

The data used in this case are data read out from the waveform memory 8, and are identical to the data used in the I/Q coordinate data measuring section 25 and the power measuring section 26 in the time domain.

A measurement interval setting section 52 designates an interval on the waveform memory 8 which is used by an FFT section (Fast Fourier Transform section) 53 by using the burst start signal j output from the burst synchronous detection section 12, and outputs the resultant information to the FFT section 53.

Figure 8:
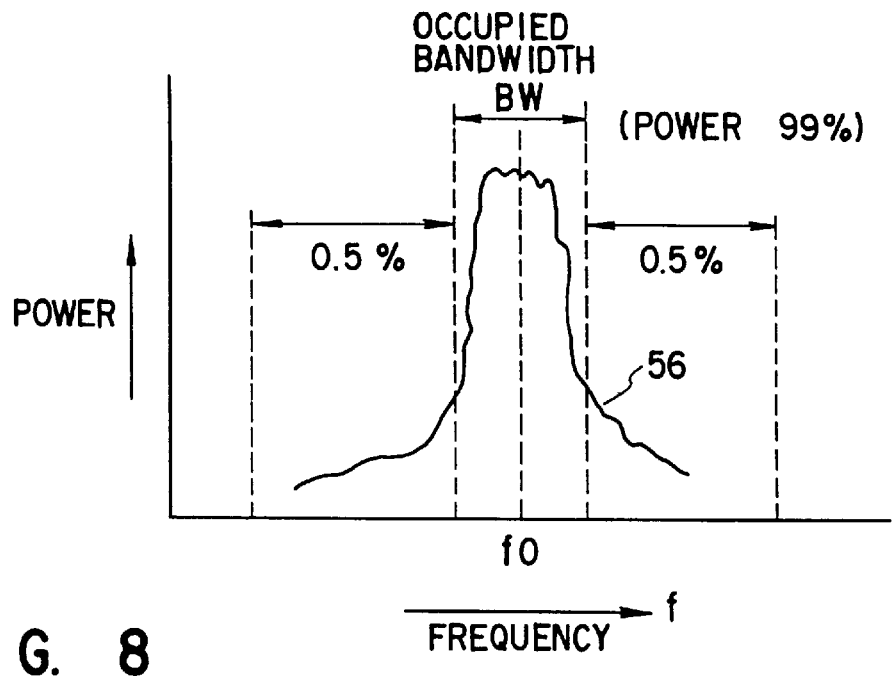
FIG. 8 is a graph for explaining a method of calculating the occupied bandwidth in the frequency measuring section.

The FFT section 53 executes Fourier transform processing for the I/Q data in the waveform memory 8 to obtain, for example, a frequency characteristic 56 in FIG. 8, and transmits it to an occupied bandwidth calculating section 54 and an adjacent channel leakage power calculating section 55.

The occupied bandwidth calculating section 54 calculates an occupied bandwidth BW from the frequency characteristic 56 in FIG. 8.

More specifically, as shown in FIG. 8, a bandwidth in which 99% of the total power (power/signal level) of the power at the respective frequency positions in the frequency characteristic 56 falls is calculated as the occupied bandwidth BW.

Figure 9:
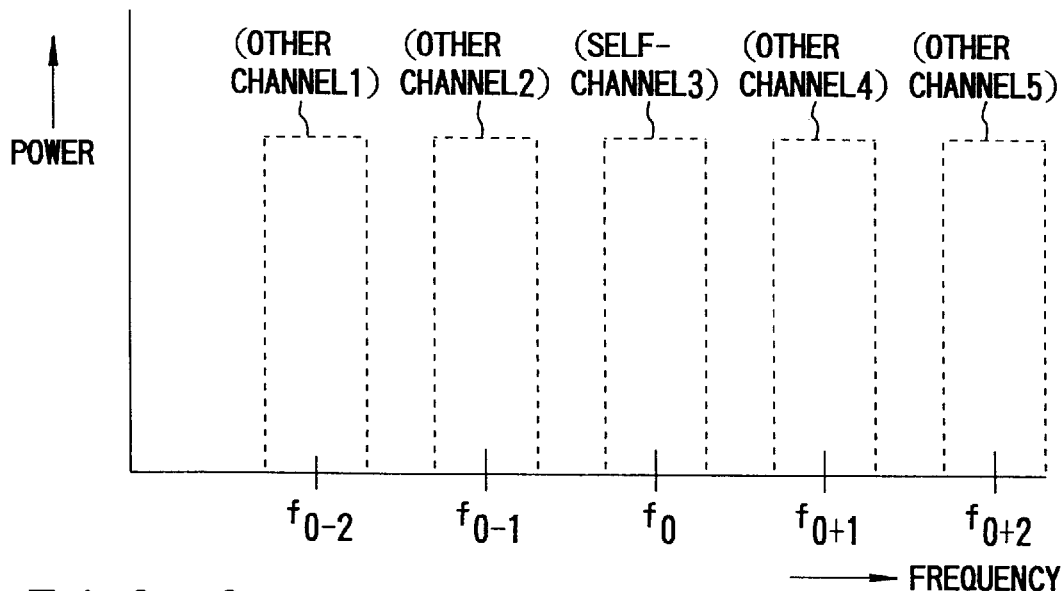
FIG. 9 is a graph for explaining a method of calculating the adjacent channel leakage power in the frequency measuring section.

As shown in FIG. 9, the adjacent channel leakage power calculating section 55 calculates the power within channels determined by a predetermined standard to which the calculated frequency characteristic 56, or the relative value of the power within the self-channel 3 to the power leaking into adjacent channels 1, 2, 4, and 5, as adjacent channel leakage power.

The frequency measuring section 27 in FIG. 7 calculates the occupied bandwidth and adjacent channel leakage power of the signal a by using the regenerated burst start signal j.

As described above, the data analyzing section 14 calculates measurement results of the respective measurement items in the respective measurement categories by using the clock signal g, the burst start signal j, and the demodulated digital data which are respectively obtained by the clock synchronous detection section 11, the burst synchronous detection section 12, the demodulation section 9, and checks whether the respective calculation results comply with predetermined standards.

The data analyzing section 14 displays the respective measurement items, calculation results, and determination results on the display unit 28.

FIG. 10 shows all the measurement results displayed on the display unit 28.

In this embodiment, the operator can set/determine in advance through the operating section 29 whether to execute measurement and determination with respect to each of the measurement items belonging to the three measurement categories.

The measurement values concerning the measurement items for which the execution of measurement is selected are displayed on the display unit 28. In addition, pass/fail determination is performed with respect to the measurement values of the measurement items for which the execution of determination is selected.

In this case, the data analyzing section 14 includes a determination section (not shown) and a storage section (not shown) in which allowable values required for determination are stored. Upon reception of the above measurement results, the data analyzing section 14 performs comparison/determination.

If a certain measurement value passes, "Pass" is displayed on the display unit 28. Otherwise, "Fail" is displayed.

If a failure is determined with respect to at least one measurement item, a failure is determined as the overall determination concerning the signal a, and "Overall Determination: Failure" is displayed on the display unit 28.

The data analyzing section 14 can display interim data in a calculation process on the display unit 28 in accordance with an operation instruction from the operator. Some display examples will be described below.

FIG. 11B shows the loci of the I/Q coordinate data used to calculate the modulation precision and the frequency deviation in FIG. 6.

FIG. 11A is a chart obtained by extracting only the symbol points in FIG. 11B, and connecting the points through straight lines.

FIG. 12 shows the time characteristic of the signal a in the power measuring section 26 which is displayed on the display unit 28.

FIG. 13 shows the frequency characteristic of the signal a subjected to frequency analysis in the FFT section 53 of the frequency measuring section 27.

The above occupied bandwidth and adjacent channel leakage power are calculated on the basis of this frequency characteristic.

In the radio communication analyzer having the above arrangement, the signal a input from the radio unit to be tested is converted into the digital signal $a_1$ by the A/D converter 3, and the digital signal is demodulated into the digital baseband signals I(t) and Q(t) by the quadrature demodulation section 4. These baseband signals I(t) and Q(t) are temporarily stored/held in the waveform memory 8.

The clock signal g for the digital data signal of the signal a is detected by the clock synchronous detection section 11. In addition, the burst start signal j for the signal a is detected by the burst synchronous detection section 12.

In the data analyzing section 14, the I/Q coordinate data measuring section 25 calculates the modulation precision, frequency deviation, and the like of the signal a, and the power measuring section 26 calculates the power precisions of the signal a, e.g., the antenna power deviation, the carrier-off interval leakage power, and the ramp-up/ramp-down characteristic.

The frequency measuring section 27 calculates the frequency precisions of the signal a, e.g., the occupied bandwidth and the adjacent channel leakage power.

The calculated characteristics and precisions are displayed on the display unit 28, together with pass/fail determination with respect to the respective standards.

The common data obtained in advance, e.g., the clock signal g, the burst start signal j, and the demodulated digital data, are used by the data analyzing section 14 in the process of calculating the respective characteristics and precisions.

Since the clock signal g, the burst start signal j, and the demodulation digital data need not be obtained for each of the above measurement categories and items, the processing efficiency of each calculation processing can be improved.

In addition, since identical signals stored in the waveform memory 8 are used to calculate characteristics and precisions, the respective calculation results can be compared to improve the calculation precision.

Furthermore, since the characteristics and precisions calculated by the data analyzing section 14 are simultaneously displayed on the display unit 28, the test performance of the operator can be improved.

In this embodiment, the single waveform data stored in the waveform memory 8 is used to measure the respective characteristics and precisions concerning all the measurement categories and items.

Strictly speaking, there are an optimal sampling frequency and an optimal filter characteristic for a signal to be tested for each measurement category and item. However, a high sampling frequency is set to set a moderate filter characteristic, and correction is performed such that each characteristic and precision can be measured optimally in the process of calculation concerning each measurement item.

In this manner, any characteristic deviations from the optimal sampling frequency and the optimal filter characteristic are corrected in the process of calculation concerning each measurement item. With this processing, even if the same waveform data is used for all the measurement items, no deterioration in measurement precision occurs.

As has been described above, in the radio communication analyzer of the present invention, baseband signals obtained by quadrature demodulating a signal to be tested are temporarily stored in the waveform memory, and clock synchronization information and burst synchronization information are detected from the stored baseband signals. In addition, precisions and characteristics concerning the respective measurement items in the respective measurement categories are calculated by using the common of the clock synchronization information, the burst synchronization information and the baseband signal.

According to the radio communication analyzer of the present invention, therefore, a measurement process common to the respective measurement categories can be shared, and the respective measurement items belonging to the respective measurement categories can be processed concurrently based on the same data, resulting in a great improvement in measurement efficiency. In addition, since the measurement results can be simultaneously displayed, a great improvement in operability in measurement can be attained.

Moreover, according to the radio communication analyzer of the present invention, since measurement processes are performed concurrently on the basis of the same data, data that reveal the time relationship between the measurement results can be obtained.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A radio communication analyzer for testing signal characteristics of a carrier, as a target signal to be tested, which has undergone quadrature modulation using a digital data signal output from a radio unit to be tested, comprising:

an A/D converter for converting the target signal into a target digital signal;

a quadrature demodulation section for performing quadrature demodulation of the digital signal obtained by said A/D converter and outputting digital baseband signals;

a waveform memory for storing waveforms of the digital baseband signals output from said quadrature demodulation section;

a clock synchronous detection section for detecting clock synchronization information for the digital data signal which is contained in the target signal from the signal waveforms stored in said waveform memory;

a demodulation section for sequentially reading out the baseband signals stored in said waveform memory and obtaining demodulated digital data by using the clock synchronization information detected by said clock synchronous detection section;

a burst synchronous detection section for producing burst synchronization information representing a burst start position of the target signal from the demodulated digital data produced by said demodulation section or the signal waveforms stored in said waveform memory;

I/Q coordinate data measuring means for measuring characteristics of an inphase component (I) and a quadrature component (Q) of the target signal, on an I/Q coordinate system, from the signal waveforms stored in said waveform memory by using the clock synchronization information, the burst synchronization information, and the demodulated digital data;

power measuring means for obtaining an amplitude domain characteristic of the target signal from the signal waveforms stored in said waveform memory by using the clock synchronization information and the burst synchronization information;

frequency measuring means for obtaining a frequency domain characteristic of the target signal from the signal waveforms stored in said waveform memory by using the burst synchronization information; and a display unit for simultaneously displaying at least two of the characteristics of the inphase component (I) and quadrature component (Q) of the target signal which are obtained by said I/Q coordinate data measurement means, the amplitude domain characteristic of the target signal which is obtained by said power measuring means, and the frequency domain characteristic of the target signal which is obtained by said frequency measuring means.

2. An analyzer according to claim 1, wherein the characteristics of the inphase component (I) and quadrature component (Q) of the target signal which are measured by said I/Q coordinate measuring means on the I/Q coordinate system include a modulation precision and frequency deviation of the target signal.

3. An analyzer according to claim 1, wherein the amplitude domain characteristic of the target signal which is measured by said power measuring means includes an antenna power deviation, carrier-off interval leakage power, and ramp-up/ramp-down characteristics of the target signal.

4. An analyzer according to claim 1, wherein the frequency domain characteristic of the target signal which is measured by said frequency measuring means includes an occupied bandwidth and adjacent channel leakage power of the target signal.

5. An analyzer according to claim 1, wherein the characteristics of the inphase component (I) and quadrature component (Q) of the target signal which are measured by said I/Q coordinate measuring means on the I/Q coordinate system include a modulation precision and frequency deviation of the target signal, the amplitude domain characteristic of the target signal which is measured by said power measuring means includes an antenna power deviation, carrier-off interval leakage power, and ramp-up/ramp-down characteristics of the target signal, and the frequency domain characteristic of the target signal which is measured by said frequency measuring means includes an occupied bandwidth and adjacent channel leakage power of the target signal.

6. An analyzer according to claim 1, wherein said quadrature demodulation section comprises:

a reference signal generating section using a ROM storing sine waveform data, amplitude values stored at addresses in the ROM being sequentially read out to finally output a reference signal having a frequency equal to a predetermined intermediate frequency;

a first multiplying section to which the target signal is input and the reference signal from said reference signal generating section is directly input; and a second multiplying section to which the target signal is input and the reference signal from said reference signal generating section is input after undergoing a $\pi/2$ phase shift, and said first and second multiplying sections multiply the input target signals by the two orthogonal reference signals to output baseband signals I(t) and Q(t) of the inphase component (I) and the quadrature component (Q) of the target signal as quadrature demodulated outputs.

7. An analyzer according to claim 6, wherein said clock synchronous detection section regenerates a clock signal serving as clock synchronization information for regenerating data contained in the target signal from the baseband signals I(t) and Q(t) output from said first and second multiplying sections.

8. An analyzer according to claim 7, wherein said demodulation section comprises:

first and second sampling sections for sampling the baseband signals I(t) and Q(t) output from said first and second multiplying sections in synchronism with the clock signal regenerated by said clock synchronous detection section; and a demodulator for generating the demodulated digital data from two sampling data output from said first and second sampling sections.

9. An analyzer according to claim 6, wherein said clock synchronous detection section comprises:

first and second square calculating sections for squaring the baseband signals I(t) and Q(t) output from said first and second multiplying sections;

a synthesizing section for synthesizing two outputs from said first and second square calculating sections and outputting a synthetic signal;

a reference clock generating section using a ROM storing sine waveform data, amplitude values stored at addresses in the ROM being sequentially read out to finally output a reference clock signal having a frequency substantially equal to a clock frequency equal to a period of an original signal;

a third multiplying section to which the synthetic signal output from said synthesizing section is input and the reference clock signal from said reference clock generating section is directly input;

a fourth multiplying section to which the synthetic signal output from said synthesizing section is input and the reference clock signal from said reference clock generating section is input after undergoing a π/2 phase shift, said third and fourth multiplying sections outputting phase signals $I_2(t)$ and $Q_2(t)$ by multiplying the input synthetic signals by the two orthogonal reference clock signals;

first and second low-pass filters for outputting integral values i and q by removing high-frequency components from the phase signals $I_2(t)$ and $Q_2(t)$ output from said third and fourth multiplying sections;

a phase difference calculating section for calculating a phase difference $\psi=\text{Tan}^{-1}(q/i)$ between the baseband signals I(t) and Q(t) and the reference clock signals from the integral values i and q output from said first and second low-pass filters; and a timing calculating section for outputting a predetermined clock signal as clock synchronization information for the digital data signal when a phase of a reference phase of the reference clock signal output from said reference clock generating section is reached with the ψ in accordance with the phase difference $\psi=\text{Tan}^{-1}(q/i)$ output from said phase difference calculating section.

10. An analyzer according to claim 1, wherein said quadrature demodulation section comprises:

a reference signal generating section using a ROM storing sine waveform data, amplitude values stored at addresses in the ROM being sequentially read out to finally output a reference signal having a frequency equal to a predetermined intermediate frequency;

a first multiplying section to which the target signal is input and the reference signal from said reference signal generating section is directly input; and a second multiplying section to which the target signal is input and the reference signal from said reference signal generating section is input after undergoing a π/2 phase shift, said first and second multiplying sections multiply the input target signals by the two orthogonal reference signals to output baseband signals I(t) and Q(t) of the inphase component (I) and the quadrature component (Q) of the target signal as quadrature demodulated outputs, said clock synchronous detection section regenerates a clock signal serving as clock synchronization information for regenerating data contained in the target signal from the baseband signals I(t) and Q(t) output from said first and second multiplying sections, said demodulation section comprises:

first and second sampling sections for sampling the baseband signals I(t) and Q(t) output from said first and second multiplying sections in synchronism with the clock signal regenerated by said clock synchronous detection section; and a demodulator for generating the demodulated digital data from two sampling data output from said first and second sampling sections, and said clock synchronous detection section comprises:

first and second square calculating sections for squaring the baseband signals I(t) and Q(t) output from said first and second multiplying sections;

a synthesizing section for synthesizing two outputs from said first and second square calculating sections and outputting a synthetic signal;

a reference clock generating section using a ROM storing sine waveform data, amplitude values stored at addresses in the ROM being sequentially read out to finally output a reference clock signal having a frequency substantially equal to a clock frequency equal to a period of an original signal;

a third multiplying section to which the synthetic signal output from said synthesizing section is input and the reference clock signal from said reference clock generating section is directly input;

a fourth multiplying section to which the synthetic signal output from said synthesizing section is input and the reference clock signal from said reference clock generating section is input after undergoing a π/2 phase shift, said third and fourth multiplying sections outputting phase signals $I_2(t)$ and $Q_2(t)$ by multiplying the input synthetic signals by the two orthogonal reference clock signals;

first and second low-pass filters for outputting integral values i and q by removing high-frequency components from the phase signals $I_2(t)$ and $Q_2(t)$ output from said third and fourth multiplying sections;

a phase difference calculating section for calculating a phase difference $\psi=\text{Tan}^{-1}(q/i)$ between the baseband signals I(t) and Q(t) and the reference clock signals from the integral values i and q output from said first and second low-pass filters; and a timing calculating section for outputting a predetermined clock signal as clock synchronization information for the digital data signal when a phase of a reference phase of the reference clock signal output from said reference clock generating section is reached with the ψ in accordance with the phase difference $\psi=\text{Tan}^{-1}(q/i)$ output from said phase difference calculating section.

11. A radio communication analyzer for testing signal characteristics of a carrier, as a target signal to be tested, which has undergone quadrature modulation using a digital data signal output from a radio unit to be tested, comprising:

quadrature demodulation means for performing quadrature demodulation of the target signal and outputting a baseband signal;

storage means for storing waveform data of the baseband signal output from said quadrature demodulation means;

clock synchronous detection means for detecting clock synchronization information contained in the target signal on the basis of the waveform data stored in said storage means;

demodulation means for sequentially reading out the waveform data stored in said storage means and obtaining demodulated digital data in accordance with the clock synchronization information detected by said clock synchronous detection means;

burst synchronous detection means for producing burst synchronization information representing a burst start position of the target signal based on the demodulated digital data produced by said demodulation means or the waveform data stored in said storage means;

measuring means for measuring an amplitude domain characteristic of the target signal, a frequency domain characteristic of the target signal, and characteristics of an inphase component (I) and quadrature component (Q) of the target signal on an I/Q coordinate system, based on the waveform data stored in said storage means, by selectively using the clock synchronization information detected by said clock synchronous detection means, the burst synchronization information detected by said burst synchronous detection means, and the demodulated digital data obtained by said demodulation means; and output means for outputting the amplitude domain characteristic of the target signal, the frequency domain characteristic of the target signal, and the characteristics of the inphase component (I) and quadrature component (Q) of the target signal on the I/Q coordinate system, which are obtained by said measuring means, in association with each other.

12. An analyzer according to claim 11, wherein the characteristics of the inphase component (I) and quadrature component (Q) of the target signal which are measured by said measuring means on the I/Q coordinate system include a modulation precision and frequency deviation of the target signal.

13. An analyzer according to claim 11, wherein the amplitude domain characteristic of the target signal which is measured by said measuring means includes an antenna power deviation, carrier-off interval leakage power, and ramp-up/ramp-down characteristics of the target signal.

14. An analyzer according to claim 11, wherein the frequency domain characteristic of the target signal which is measured by said measuring means includes an occupied bandwidth and adjacent channel leakage power of the target signal.

15. An analyzer according to claim 11, wherein the characteristics of the inphase component (I) and quadrature component (Q) of the target signal which are measured by said measuring means on the I/Q coordinate system include a modulation precision and frequency deviation of the target signal, the amplitude domain characteristic of the target signal which is measured by said measuring means includes an antenna power deviation, carrier-off interval leakage power, and ramp-up/ramp-down characteristics of the target signal, the frequency domain characteristic of the target signal which is measured by said measuring means includes an occupied bandwidth and adjacent channel leakage power of the target signal, and said output means includes a display unit for simultaneously displaying at least two of the inphase component (I) and quadrature component (Q) of the target signal, the amplitude domain characteristic of the target signal, and the frequency domain characteristic of the target signal, which are obtained by said measuring means.

16. An analyzer according to claim 11, wherein said quadrature demodulation section comprises:

a reference signal generating section using a ROM storing sine waveform data, amplitude values stored at addresses in the ROM being sequentially read out to finally output a reference signal having a frequency equal to a predetermined intermediate frequency;

a first multiplying section to which the target signal is input and the reference signal from said reference signal generating section is directly input; and a second multiplying section to which the target signal is input and the reference signal from said reference signal generating section is input after undergoing a $\pi/2$ phase shift, and said first and second multiplying sections multiply the input target signals by the two orthogonal reference signals to output baseband signals I(t) and Q(t) of the inphase component (I) and the quadrature component (Q) of the target signal as quadrature demodulated outputs.

17. An analyzer according to claim 16, wherein said clock synchronous detection section regenerates a clock signal serving as clock synchronization information for regenerating data contained in the target signal from the baseband signals I(t) and Q(t) output from said first and second multiplying sections.

18. An analyzer according to claim 17, wherein said demodulation section comprises:

first and second sampling sections for sampling the baseband signals I(t) and Q(t) output from said first and second multiplying sections in synchronism with the clock signal regenerated by said clock synchronous detection section; and a demodulator for decoding producing the demodulated digital data from two sampling data output from said first and second sampling sections.

19. An analyzer according to claim 16, wherein said clock synchronous detection section comprises:

first and second square calculating sections for squaring the baseband signals I(t) and Q(t) output from said first and second multiplying sections;

a synthesizing section for synthesizing two outputs from said first and second square calculating sections and outputting a synthetic signal;

a reference clock generating section using a ROM storing sine waveform data, amplitude values stored at addresses in the ROM being sequentially read out to finally output a reference clock signal having a frequency substantially equal to a clock frequency equal to a period of an original signal;

a third multiplying section to which the synthetic signal output from said synthesizing section is input and the reference clock signal from said reference clock generating section is directly input;

a fourth multiplying section to which the synthetic signal output from said synthesizing section is input and the reference clock signal from said reference clock generating section is input after undergoing a $\pi/2$ phase shift, said third and fourth multiplying sections outputting phase signals $I_2(t)$ and $Q_2(t)$ by multiplying the input synthetic signals by the two orthogonal reference clock signals;

first and second low-pass filters for outputting integral values i and q by removing high-frequency components from the phase signals $I_2(t)$ and $Q_2(t)$ output from said third and fourth multiplying sections;

a phase difference calculating section for calculating a phase difference $\psi=\text{Tan}^{-1}(q/i)$ between the baseband signals I(t) and Q(t) and the reference clock signals from the integral values i and q output from said first and second low-pass filters; and a timing calculating section for outputting a predetermined clock signal as clock synchronization information for the digital data signal when a phase of a reference phase of the reference clock signal output from said reference clock generating section is reached with the $\psi$ in accordance with the phase difference $\psi=\text{Tan}^{-1}(q/i)$ output from said phase difference calculating section.

20. An analyzer according to claim 11, wherein said quadrature demodulation section comprises:

a reference signal generating section which is constituted by a ROM in which sine waveform data is stored, and sequentially reads out amplitude values stored at addresses in the ROM to finally output a reference signal having a frequency equal to a predetermined intermediate frequency;

a first multiplying section to which the target signal is input and the reference signal from said reference signal generating section is directly input; and a second multiplying section to which the target signal is input and the reference signal from said reference signal generating section is input after undergoing a $\pi/2$ phase shift, said first and second multiplying sections multiply the input target signals by the two orthogonal reference signals to output baseband signals I(t) and Q(t) of the inphase component (I) and the quadrature component (Q) of the target signal as quadrature demodulated outputs, said clock synchronous detection section regenerates a clock signal serving as clock synchronization information for regenerating data contained in the target signal from the baseband signals I(t) and Q(t) output from said first and second multiplying sections, said demodulation section comprises:

first and second sampling sections for sampling the baseband signals I(t) and Q(t) output from said first and second multiplying sections in synchronism with the clock signal regenerated by said clock synchronous detection section; and a demodulator for producing the demodulated digital data from two sampling data output from said first and second sampling sections into four decoded data by parallel/serial conversion, and said clock synchronous detection section comprises:

first and second square calculating sections for squaring the baseband signals I(t) and Q(t) output from said first and second multiplying sections;

a synthesizing section for synthesizing two outputs from said first and second square calculating sections and outputting a synthetic signal;

a reference clock generating section which is constituted by a ROM in which sine waveform data is stored, and sequentially reads out amplitude values stored at addresses in the ROM to finally output a reference clock signal having a frequency substantially equal to a clock frequency equal to a period of an original signal;

a third multiplying section to which the synthetic signal output from said synthesizing section is input and the reference clock signal from said reference clock generating section is directly input;

a fourth multiplying section to which the synthetic signal output from said synthesizing section is input and the reference clock signal from said reference clock generating section is input after undergoing a $\pi/2$ phase shift, said third and fourth multiplying sections outputting phase signal $I_2(t)$ and $Q_2(t)$ by multiplying the input synthetic signals by the two orthogonal reference clock signals;

first and second low-pass filters for outputting integral values i and q by removing high-frequency components from the phase signals $I_2(t)$ and $Q_2(t)$ output from said third and fourth multiplying sections;

a phase difference calculating section for calculating a phase difference $\psi=\text{Tan}^{-1}(q/i)$ between the baseband signals I(t) and Q(t) and the reference clock signals from the integral values i and q output from said first and second low-pass filters; and a timing calculating section for outputting a predetermined clock signal as clock synchronization information for the digital data signal when a phase of a reference phase of the reference clock signal output from said reference clock generating section in accordance with the phase difference $\psi=\text{Tan}^{-1}(q/i)$ output from said phase difference calculating section.

* * * * *